No. 895,018.
PATENTED AUG. 4, 1908.
W. C. HOOKER.
MOUSE TRAP.
APPLICATION FILED NOV. 30, 1907.
2 SHEETS—SHEET 2.
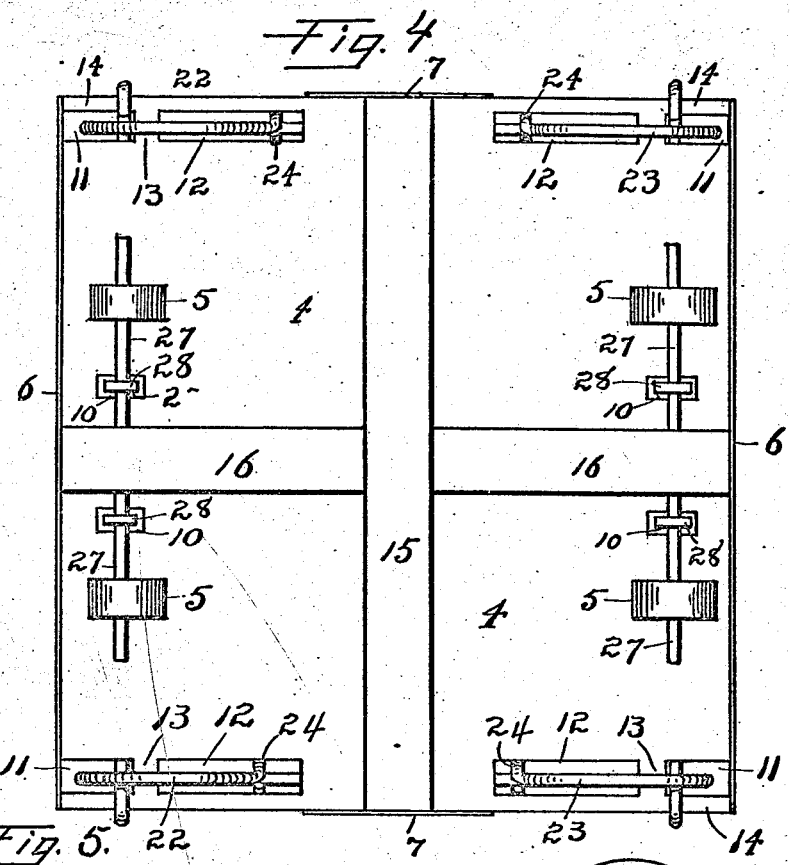
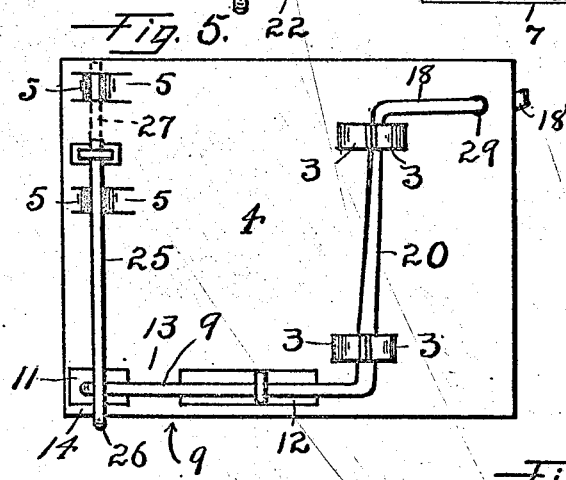
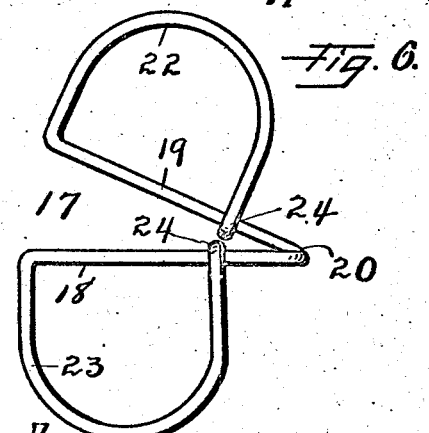
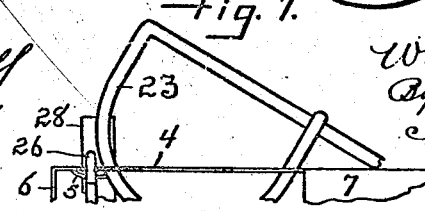
WITNESSES:
H. N. Brandalf
S. R. Richards
INVENTOR.
Wm. C. Hooker,
By H. M. Richards,
ATTORNEY.

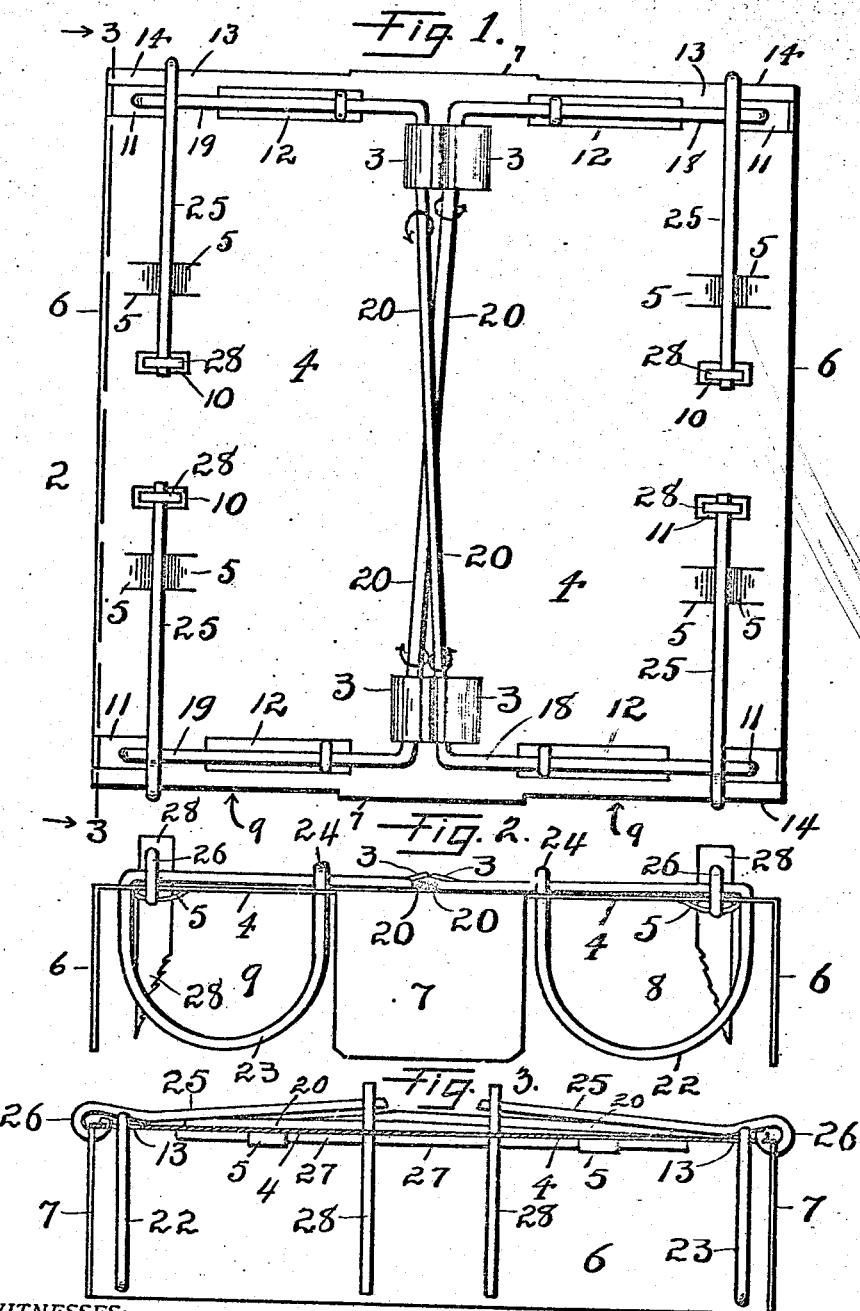

UNITED STATES PATENT OFFICE.

WILLIAM CHAUNCEY HOOKER, OF ABINGDON, ILLINOIS.

MOUSE-TRAP.

No. 895,018.   Specification of Letters Patent.   Patented Aug. 4, 1908.

Application filed November 30, 1907. Serial No. 404,484.

*To all whom it may concern:*

Be it known that I, WILLIAM CHAUNCEY HOOKER, a citizen of the United States, and a resident of Abingdon, in the county of Knox and State of Illinois, have invented a new and useful Mouse-Trap, of which the following is a specification.

The herein described invention pertains to that class of mouse traps commonly known as "chokers". While I have in the drawings forming a part hereof shown it, and shall herein describe it as a multiple trap, it will be evident that my improvements may be incorporated in a trap adapted to catch but one mouse or other rodent. And it will be manifest that by enlarging the several parts of the trap it will be suitable for catching larger animals than mice.

A leading object of the invention is to provide a novel spring.

Another leading object is to include the spring and catching jaw in one, or to make them integral.

Still another object is to utilize the last named means in a multiple-opening trap, or trap provided with a plurality of entrances for mice, a single wire constituting two jaws and the spring which actuates them.

A further object is to dispense with coiled or springs of expensive construction.

A further object is to provide suitable means on which said jaws and springs, or a plurality of such, together with the means for setting and releasing them may be mounted.

A further object is to provide a practical and effective trap of extreme simplicity which can be economically produced without the sacrifice of either strength or durability.

To furnish a trap of the character described which is easy of manipulation constitutes a further object of the invention; while to provide a novel means of restraining each jaw of the pairs thereof forms still another.

A trap embodying the preferred construction of parts, and their mutual relationship, combination, arrangement, and organization in a composite body, is hereinafter described and made the subject matter of claims hereto appended, and is clearly illustrated in the accompanying drawings, in which:—

Figure 1 is a top plan; Fig. 2, a front elevation, seen from either end; Fig. 3, a sectional view, taken in the line 3—3, Fig. 1; Fig. 4, a modification, a plan seen from below. In this view braces are added to the construction shown at the other figures. Fig. 5 is another modification, a plan, showing a single jaw trap, the spring being of sheet metal. Fig. 6 is an end view of the two-jaw spring, removed from the trap; and Fig. 7, a fragmental end elevation showing the parts in sprung engagement.

The same reference numeral used herein refers to the same or a similar part in the several figures of the drawings, in which 2 indicates a rectangular sheet metal base which may be economically formed by dies at a single operation. Lips 3 in pairs are struck up from the top 4 of the base longitudinally of its median line, and transverse slits are cut near its edges to form bearings 5 for a pintle hereinafter described. The metal of the base is bent downwardly to form supporting sides 6 and ends 7, the outer portions of the latter being cut away to form entrances 9. Coinciding slots 10 are cut to correspond with the bearings 5. Transverse slots 11 and 12 in pairs are cut near each end of the base, whereby stops 13 and cross-bars 14 are formed. If preferred, (although I consider it unnecessary,) braces 15, 16, of wood may be set beneath the base as shown at Fig. 4 and fixed by tacks or in any other suitable manner.

My improved torsion spring jaw 17 is constructed of a wire adapted to withstand torsional strain as well as to be bent at an acute angle. Portions 18—19 are bent at approximately right angles to the main portion 20 and substantially in the same direction therefrom, their outer portions bent downwardly to form U-shaped jaws 22, 23 and their ends bent to form eyes 24 which encircle the portions 18 and 19 and are preferably closed after assembling. The preferred relative positions of the two jaws thus formed, (before being placed in position) are best shown at Fig. 6. The spring members 20 are laid within the lips 3, crossing each other as best shown at Fig. 1, when a slight hammer blow will close the lips and secure said members thereunder, but free to turn. The eyes 24 are passed downwardly through the slots 11, thence under the stops 13 and upwardly through the slots 12, where each is slipped over and secured to its proper member 18 or 19. The direction of torsion is indicated by the curved arrows at Fig. 1.

A latch or locking bar 25 formed of a short section of wire having an eye 26 is hinged by the latter to each cross-bar 14. A pintle 27 is slipped through each pair of bearings 5 longitudinally of the top, and through pivotal apertures in a pair of tripping levers 28 passed through the slots 10 at each side of the trap, the depending portion of each of said levers being pointed and serrated for easy attachment to and securement of the bait, and each is perforated at its upper portion for the reception of the free end of the latch.

In the modification shown at Fig. 5 I have shown a trap adapted to catch a single mouse. To better illustrate the torsion action of my improved spring I have here represented it as constructed of a strip of spring metal, one end of which is bent to form the jaw and the other of which is fixed by being passed through an aperture 29 in the base.

The operation is as follows: The parts being in unset positions (see Fig. 7,) in which some torsional strain is exerted by reason of the jaws being limited in their upward movement by the stops 13, a jaw may be depressed to the position best shown at Figs. 2 and 3, whereupon the operator will bring the latch over top thereof and engage the latch point with the aperture in the trigger. It will be evident that this, because of the distal jaw being held by the stop 13 as before described, will exert still greater torsional strain on the member 20. The jaw at the other end of the same member 20 is set in the same manner, the maximum strain being thus exerted. The operation of setting the other jaws will be apparent, and will not require further explanation. It is the custom of mice to grasp the bait and attempt to escape with it by drawing on it. It will be manifest that this operation, (the mouse having passed partly through any one of the jaws,) will throw the upper end of the tripping lever free from the latch and release that jaw, whereupon the torsional spring will forcibly untwist to a slight degree, it being limited, however, by the body of the mouse caught by the jaw and hanging between it and the base. It will be evident that the tension of the jaw at the other end of the spring is but slightly diminished, not, in fact, to a perceptible degree as regards efficiency.

It will be readily seen that my improvements are susceptible of many changes as regards form, assemblage, mounting, construction etc., and that some of the parts may be used without the others and in traps differing in many respects from those shown. I therefore do not wish to be understood as limiting my claims to specific constructions, but What I do claim is:—

1. In a trap, a torsion spring having a jaw at each of its ends.

2. In a trap, a torsion spring having an integral jaw at each of its ends.

3. In a trap, a base having depending cutaway sides, a torsion-spring-actuated jaw mounted on said base, a latch pivoted to the base, and a tripping lever adapted to engage it.

4. In a trap, the combination with a base having cutaway depending sides, of a torsion spring including a jaw mounted on the base, said jaw and cutaway portion adapted to coincide, a pivoted latch, and a pivoted tripping lever adapted to engage it, whereby the jaw may be held set.

5. A trap comprising a base including depending supports provided with oppositely disposed entries, a torsion spring mounted on the base and including jaws adapted to coincide with said entries, and means whereby the trap may be held set.

6. The combination with a base including supports having slots in its top and entrances in said supports, of a torsion spring mounted on the base and including U-shaped jaws adapted to coincide with said entrances, their limbs projected through said slots, and means whereby the trap may be held set.

7. The combination with a base including a stop member, there being apertures at each side thereof, of a torsional spring jaw mounted on said base, its movement in one direction being limited by said stop member.

8. In combination in a trap, a base including supports provided with entrances, a torsion spring mounted on the base and including a U-shaped jaw at each end thereof adapted to coincide with said entrances, the limbs thereof projected through said apertures, whereby their upward movement is limited, and means for holding the jaws in set position and for releasing them.

9. A trap comprising an apertured base, there being supports therefor provided with entrances, lips integral with the base, a torsion spring including jaws mounted in said lips, the jaws depending through said apertures and coinciding with the entrances, hinged latches adapted to restrain the jaws, and tripping levers adapted for engagement with the latches.

10. In a trap, and in combination, a base, a torsion spring-actuated jaw mounted thereon, a pointed latch pivoted on the base, and a pivoted tripping lever provided with an aperture through which the point of the latch is adapted to pass.

11. As an article of manufacture, a substantially square sheet of metal having sides and ends turned down therefrom, each end being cut away except at its middle portion, coinciding pairs of lips struck up from the top along its longitudinal median line for the purpose described, coinciding bearings struck down from the top longitudinally thereof and near its sides for the purpose described, there being apertures near each corner and transverse slots between them and the longitudinal median line of the top, whereby a stop is created, and the top provided with transverse slots coinciding with the bearings aforesaid and for the purpose set forth.

Witness my hand at Galesburg, in the county of Knox and State of Illinois, this 22d day of November, 1907.

WILLIAM CHAUNCEY HOOKER.

Witnesses:
WEBB A. HERLOCKER,
H. M. RICHARDS.